(12) United States Patent
Sato et al.

(10) Patent No.: US 7,281,522 B1
(45) Date of Patent: Oct. 16, 2007

(54) ACCELERATION SENSOR STATUS DETECTING APPARATUS

(75) Inventors: Kenichi Sato, Nagoya (JP); Kentaro Hirose, Yokkaichi (JP); Hiroyuki Ichikawa, Kani (JP)

(73) Assignees: Aisin Seiko Kabushiki Kaisha, Aichi-ken (JP); Tokai Rubber Industries, Ltd., Aichi-ken (JP)

( * ) Notice: Subject to any disclaimer, the term of this patent is extended or adjusted under 35 U.S.C. 154(b) by 0 days.

(21) Appl. No.: 11/711,744

(22) Filed: Feb. 28, 2007

(51) Int. Cl.
*F02M 51/00* (2006.01)
*G06F 19/00* (2006.01)
*G06F 7/00* (2006.01)
*G01M 17/00* (2006.01)
*G01C 25/00* (2006.01)
*F16F 7/10* (2006.01)

(52) U.S. Cl. .................. 123/492; 701/34; 702/116; 702/104; 702/96; 73/1.38; 73/1.37; 73/118.1; 188/378; 188/379

(58) Field of Classification Search ............... 73/1.38, 73/1.37, 118.1; 123/492; 188/378, 379; 701/34; 702/116, 104, 96
See application file for complete search history.

(56) References Cited

U.S. PATENT DOCUMENTS

| | | | |
|---|---|---|---|
| 4,418,567 A * | 12/1983 | Boning et al. .............. 73/35.03 |
| 5,121,729 A * | 6/1992 | Hashimoto et al. ..... 123/406.16 |
| 5,212,640 A * | 5/1993 | Matsuda ....................... 701/34 |
| 5,265,472 A * | 11/1993 | Pfeifle et al. ............. 73/514.02 |
| 5,377,523 A * | 1/1995 | Ohta et al. .................... 73/1.38 |
| 5,652,374 A * | 7/1997 | Chia et al. .................... 73/1.38 |
| 5,713,438 A * | 2/1998 | Rossetti et al. .............. 188/378 |
| 6,253,602 B1 | 7/2001 | Uchida |
| 6,510,397 B1 * | 1/2003 | Choe .......................... 702/116 |
| 6,516,651 B1 * | 2/2003 | Geen .......................... 73/1.16 |
| 6,682,153 B2 * | 1/2004 | Okai ..................... 303/122.05 |
| 6,889,655 B1 * | 5/2005 | Demizu et al. ........ 123/406.16 |
| 7,162,911 B2 * | 1/2007 | Hattori ....................... 73/1.38 |

FOREIGN PATENT DOCUMENTS

| JP | 7-174787 | 12/1993 |
|---|---|---|
| JP | 11-190741 | 12/1997 |

* cited by examiner

*Primary Examiner*—Stephen K. Cronin
*Assistant Examiner*—J. Page Hufty
(74) *Attorney, Agent, or Firm*—Reed Smith LLP; Stanley P. Fisher, Esq.; Juan Carlos A. Marquez, Esq.

(57) ABSTRACT

An acceleration sensor state detecting apparatus for detecting a state of an acceleration sensor provided at a vibrating body includes a calculating method for calculating a difference between measured results of the acceleration sensor obtained per first predetermined time that is shorter than a vibration period of the vibrating body, and a determining method for determining that the acceleration sensor is in an error state in a case that a state in which the difference calculated falls into a range between a predetermined upper limit value and a predetermined lower limit value continues for a second predetermined time or more.

4 Claims, 4 Drawing Sheets

ACCELERATION SENSOR STATUS DETECTING APPARATUS

CROSS REFERENCE TO RELATED APPLICATIONS

This application is based on and claims priority under 35 U.S.C. § 119 to Japanese Patent Application No. 2006-052238, filed on Feb. 28, 2006, the entire content of which is incorporated herein by reference.

FIELD OF THE INVENTION

This invention generally relates to an acceleration sensor state detecting apparatus. More particularly, this invention pertains to an acceleration sensor state detecting apparatus that detects a state of an acceleration sensor provided at a vibrating body.

BACKGROUND

In the case of eliminating or preventing vibration of a vibrating body such as an engine by using a vibration isolator, for example, an acceleration sensor is provided at an engine mount so as to control the vibration isolator based on a measured result of the acceleration sensor. In this case, if the acceleration sensor does not operate normally and properly, the vibration isolator cannot be controlled correctly and thus an effective elimination of vibration cannot be achieved. In order to avoid such issue, various acceleration sensor state detecting apparatuses have been considered for detecting whether the acceleration sensor operates properly.

JP07-174787A and JP11-190741A each disclose an acceleration sensor state detecting apparatus. According to the acceleration sensor state detecting apparatus disclosed in JP07-174787A, an upper limit value and a lower limit value are defined relative to a measured result of an acceleration sensor on the basis of a measured object thereof. When a state in which the measured result is above the upper limit value or below the lower limit value continues for a predetermined time or more, an error in the acceleration sensor is determined. In addition, according to the acceleration sensor state detecting apparatus disclosed in JP11-190741A, a rotation sensor for detecting a rotation speed of wheels is provided so as to detect a state of an acceleration sensor that measures an acceleration of a vehicle in motion. Then, an acceleration acquired on the basis of a measured result of the rotation sensor, and a measured result of the acceleration sensor are compared so as to detect an error in the acceleration sensor.

According to the acceleration sensor state detecting apparatus disclosed in JP07-174787A, the error in the acceleration sensor can be detected if the measured value thereof is retained over the upper limit value or below the lower limit value. However, an error that may possibly occur in the acceleration sensor when the measured value is specified between the upper limit value and the lower limit value cannot be detected. Further, according to the acceleration sensor state detecting apparatus disclosed in JP11-190741A, an error in the acceleration sensor occurring when the measured value thereof is retained between the upper limit value and the lower limit value can be detected. However, since the measured values by the other sensor and the acceleration sensor are compared for the detection of the error in the acceleration sensor, an error that might occur, in fact, in the other sensor may be mistakenly determined as the error in the acceleration sensor.

Thus, a need exists for an acceleration sensor state detecting apparatus that can accurately detect a state of an acceleration sensor.

SUMMARY OF THE INVENTION

According to an aspect of the present invention, an acceleration sensor state detecting apparatus for detecting a state of an acceleration sensor provided at a vibrating body includes a calculating method for calculating a difference between measured results of the acceleration sensor obtained per first predetermined time that is shorter than a vibration period of the vibrating body, and a determining method for determining that the acceleration sensor is in an error state in a case that a state in which the difference calculated falls into a range between a predetermined upper limit value and a predetermined lower limit value continues for a second predetermined time or more.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

An embodiment of the present invention will be explained with reference to the attached drawings.

Figure 1:
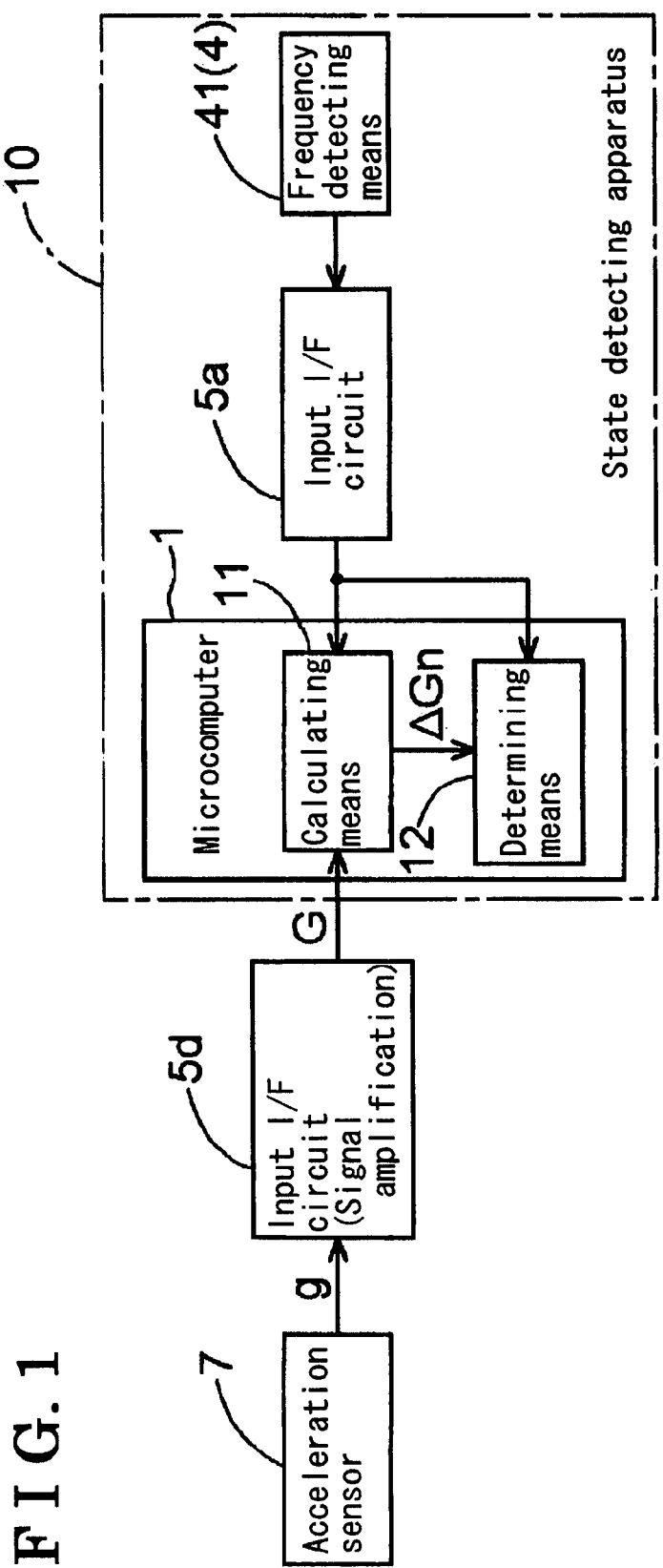
FIG. 1 is a block diagram illustrating a structure of an acceleration sensor state detecting apparatus.

FIG. 1 is a block diagram illustrating a structure of an acceleration sensor state detecting apparatus 10. The state detecting apparatus 10 according to the present embodiment detects a state of an acceleration sensor 7 based on an output signal g that is a measured result of the acceleration sensor 7. The state detecting apparatus 10 includes a calculating means 11 and a determining means 12. The calculating means 11 calculates a difference between measured results of the acceleration sensor 7 that are obtained per first predetermined time dt. The determining means 12 determines whether the acceleration sensor 7 operates normally and properly on the basis of the calculated difference of the measured results, and, for example, predetermined upper limit and lower limit values that have been specified according to a vibrating state of a vibrating body. Precisely, the determining means 12 determines that an error occurs in the acceleration sensor 7 when a state, in which the calculated difference of the measured results falls into a range between the upper limit value and the lower limit value, continues for a second predetermined time or longer.

According to the present embodiment, the output signal from the acceleration sensor 7 is amplified by an input interface circuit 5d for signal amplification, for example, and is then input as an amplified signal G to the calculating means 11. The calculating means 11 calculates a difference ΔG in the amplified signal G that is obtained per first predetermined time dt. The determining means 12 determines whether the acceleration sensor 7 operates normally on the basis of the calculated difference ΔG.

The state detecting apparatus 10 also includes a frequency detecting means 41 for detecting a vibration frequency of the vibrating body. A detection result of the frequency detecting means 41 is transmitted via an input interface circuit 5a to the calculating means 11. The calculating means 11 determines the first predetermined time dt based on the detection result of the frequency detecting means 41.

A case in which the state detecting apparatus 10 is employed in a vibration isolator 100 of an engine 13 of a vehicle will be explained with reference to FIG. 2. The vibration isolator 100 of the engine 13 (vibrating body) generates vibration in an opposite phase to that of the engine 13. Precisely, the anti-phase vibration is generated by a solenoid 2 arranged at an engine mount 9 (vibrating body) so as to prevent the vibration of the engine 13 from being transmitted to a vehicle body.

Figure 2:
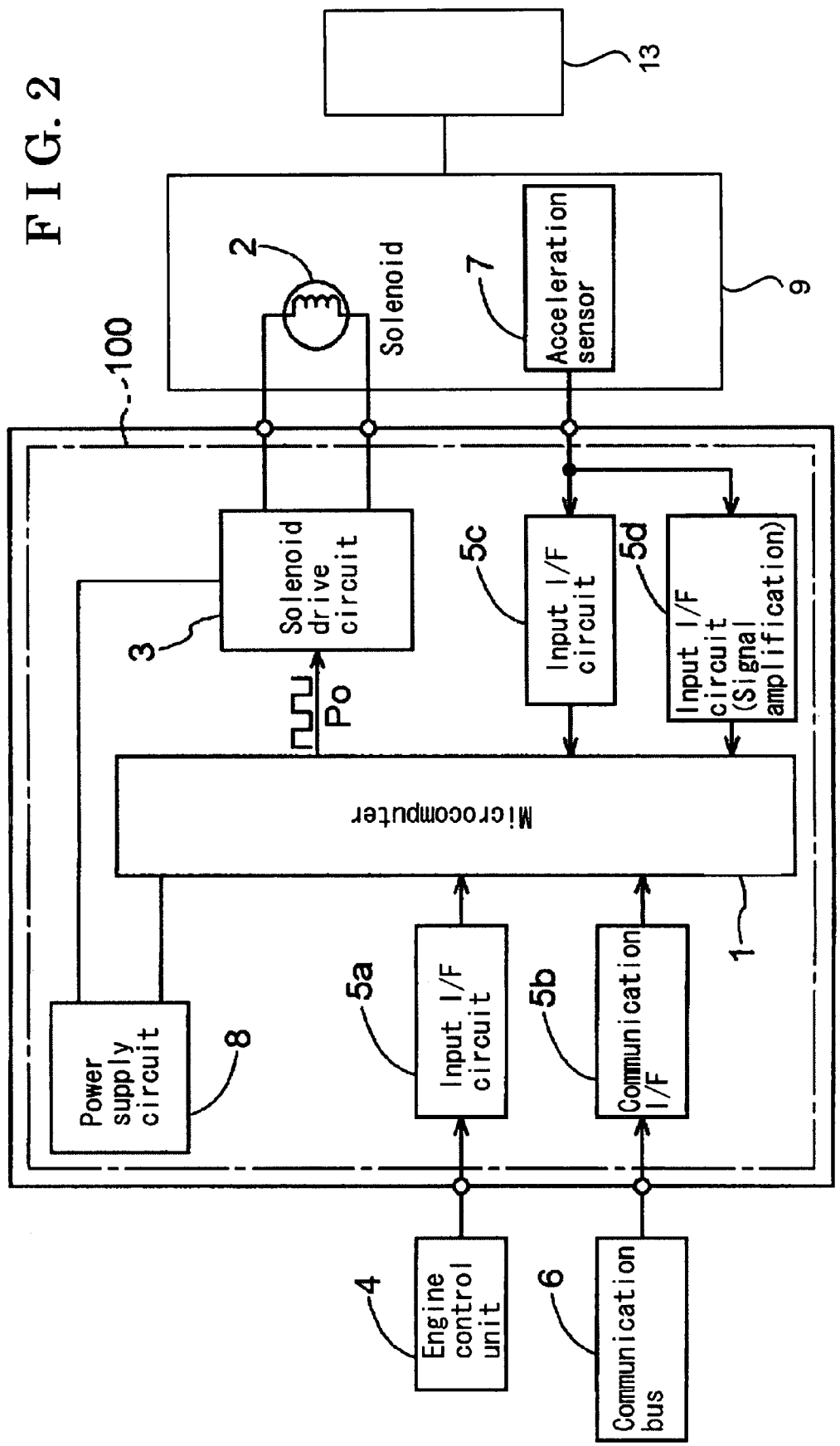
FIG. 2 is a block diagram illustrating a vibration isolator of an automobile engine.

As illustrated in FIG. 2, the vibration isolator, precisely, a vibration control ECU (Electronic Control Unit) 100 includes a microcomputer 1, a solenoid drive circuit 3, a power supply circuit 8, interface circuits 5a to 5d that perform electrical matching with various peripheral devices, and the like. In this case, the various peripheral devices include an engine control unit 4, an in-vehicle communication bus 6 connected to other control units, and the like.

The microcomputer 1, which forms the core of the vibration control ECU 100, functions as the state detecting apparatus 10 according to the present embodiment. The microcomputer 1 receives an engine rotational signal (hereinafter referred to as "TACH signal") via the input interface circuit 5a from the engine control unit 4. Afterwards, the microcomputer 1 generates a control signal such as a control pulse signal for driving the solenoid 2, which is then output to the solenoid drive circuit 3. Precisely, the microcomputer 1 outputs the control signal for switching a direction of power supply of the solenoid 2, a pulse width modulation signal Po, and the like.

As mentioned above, the solenoid 2 is controlled by the microcomputer 1 so that the solenoid 2 generates the vibration in an opposite phase to that of the engine 13. In order to monitor the vibrating state of the engine 13, the acceleration sensor 7 is provided at the engine mount 9. The acceleration sensor 7 inputs an acceleration signal obtained by the vibration of the engine 13 via an input interface circuit 5c to the microcomputer 1. The microcomputer 1 controls the solenoid 2 based on the acceleration signal from the acceleration sensor 7. At this time, the vibration of the engine 13 may be influenced by temperature, and the like. Accordingly, in order to improve accuracy of vibration control, information such as outside air temperature is input from the other control unit that includes a temperature sensor and the like to the microcomputer 1 via the communication bus 6 and a communication interface 5b.

The microcomputer 1 includes a ROM that stores a program, a RAM serving as a backup memory during execution of a program, a timer that calculates a rotational number of the engine 13 based on the TACH signal, an A/D (analog-digital) converter that digitalizes an input voltage from the acceleration sensor 7, and the like. Further, since a power supply voltage of the microcomputer 1 is low, i.e. 5 V, 3.3 V or the like in general, a voltage provided to the microcomputer 1 from a battery (not shown), i.e. 12 V, 24 V or the like, is converted by the power supply circuit 8.

Meanwhile, a relatively high voltage such as 12 V or 24 V is provided via the battery or the power supply circuit 8 to the solenoid 2 and the solenoid drive circuit 3 since the solenoid 2 and the solenoid drive circuit 3 are power circuits. The solenoid drive circuit 3 includes a bridge circuit for driving the solenoid 2 and a driver circuit for pressurizing a low voltage control signal input from the microcomputer 1 and connecting that pressurized control signal to the bridge circuit. The bridge circuit includes a power transistor, a power MOSFET (metal oxide semiconductor field effect transistor), and the like. The microcomputer 1 performs PWM control on the solenoid 2 by means of the solenoid drive circuit 3.

The acceleration signal from the acceleration sensor 7 as mentioned above is also input to the microcomputer 1 via the input interface circuit 5d for signal amplification. The microcomputer 1, which serves as the state detecting apparatus 10 according to the present embodiment, determines whether the acceleration sensor 7 operates normally and appropriately on the basis of the amplified acceleration signal. Further, the microcomputer 1 determines a first predetermined time, a second predetermined time, and upper and lower limit values used for error detection based on the TACH signal input through the input interface circuit 5a from the engine control unit 4. At this time, the first predetermined time may be equal to or smaller than a third of a half vibration period of the engine 13.

Figure 3:
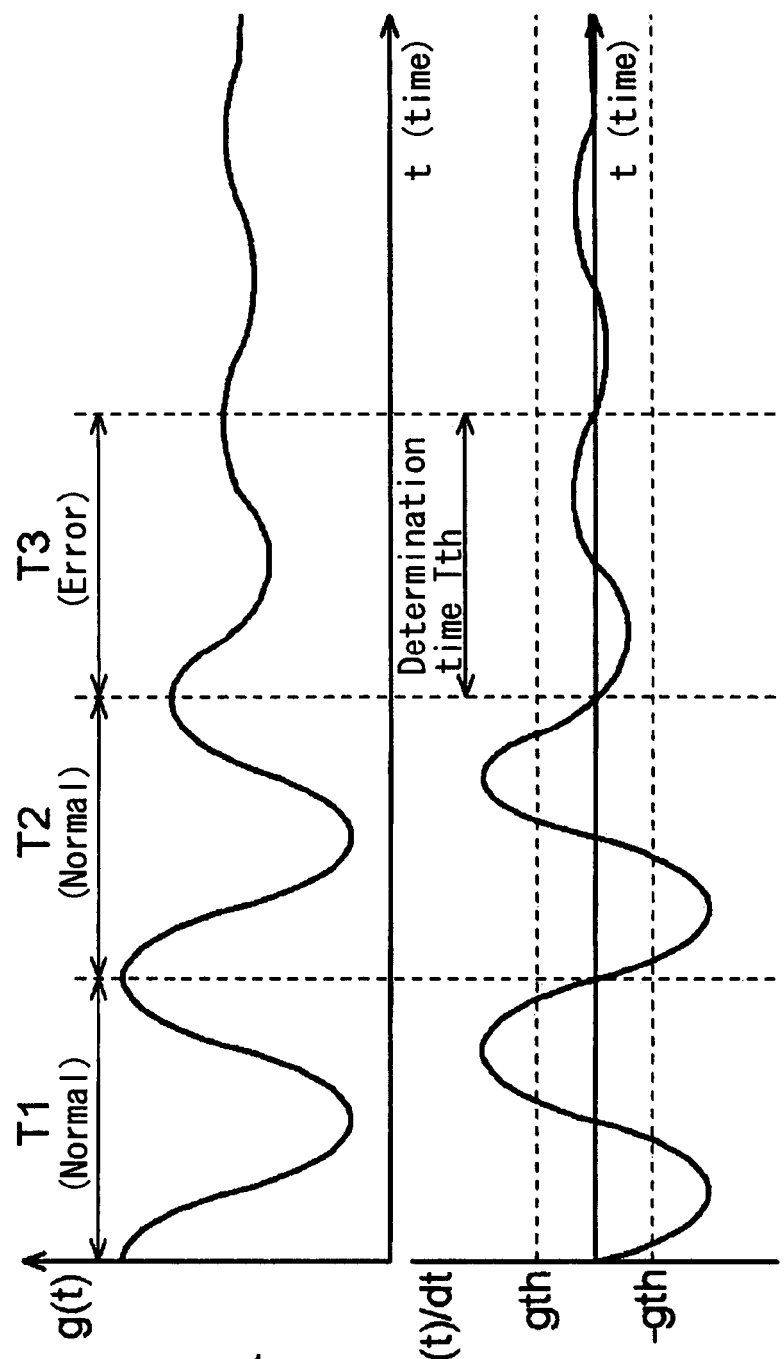
FIGS. 3A and 3B are views illustrating an example condition for determining a state of the acceleration sensor.

Next, the detection of an error in the acceleration sensor 7 conducted by the state detecting apparatus 10 will be explained with reference to FIGS. 3A and 3B. FIGS. 3A and 3B are views illustrating an example condition used for determining whether the acceleration sensor 7 is in an error state or not. Precisely, FIG. 3A illustrates g (t) that is a change with time in output signal g from the acceleration sensor 7. FIG. 3B illustrates g (t)/dt that is a variation in g (t) per first predetermined time. T1, T2 and T3 in FIGS. 3A and 3B each illustrate one vibration period of the engine 13. Tth in FIG. 3B is a determination time for determining that the acceleration sensor 7 is in the error state and corresponds to the second predetermined time according to the present embodiment. As illustrated in FIGS. 3A and 3B, the acceleration sensor 7 operates normally and appropriately in the period of T1 and T2. On the other hand, during and after the period of T3, the acceleration sensor 7 is in the error state in which, for example, the change with time in output signal g (t) is retained at a substantially constant value. The acceleration sensor 7 is in the error state when a wiring for output the acceleration signal is shorted with the other wiring, the acceleration cannot be detected because of the failure of the acceleration sensor 7 itself, and the like.

Even during the operation of the vibration isolator 100, the vibration of the engine 13 is not completely eliminated. Accordingly, when the acceleration sensor 7 is in the normal operating state, the acceleration sensor 7 detects the vibration and then the change with time in output signal g (t) represents a vibration waveform as in the period of T1 and T2 in FIG. 3A. On the other hand, when the acceleration sensor 7 is in the error state, the change with time in output signal g (t) represents, for example, a substantially constant value as in the period of T3 in FIG. 3A instead of the vibration waveform.

As illustrated in FIG. 3B, in the cases where the acceleration sensor 7 is in the normal operating state, the variation in g (t) per first predetermined time dg (t)/dt represents the vibration waveform. Thus, dg (t)/dt exceeds an error detection upper limit value gth and falls below an error detection lower limit value −gth one time each during one vibration period of the engine 13. On the other hand, in the cases where the acceleration sensor 7 is in the error state, dg (t)/dt is retained at a substantially constant value. Thus, dg (t)/dt is defined to be within a range between the error detection upper limit value gth and the error detection lower limit value −gth. Accordingly, by monitoring whether a state, in which calculated dg (t)/dt is not above the upper limit value and not below the lower limit value, continues for the determination time Tth (which corresponds to the second predetermined time according to the present embodiment), the error in the acceleration sensor 7 can be determined. The determination time Tth is defined on the basis of frequency of the engine 13 and is equal to or greater than a half period, more precisely, one period, of the vibration of the engine 13, for example.

For the purpose of simple explanation, an example of detecting the error in the acceleration sensor 7 by monitoring the variation in g (t) per first predetermined time dg (t)/dt is illustrated in FIGS. 3A and 3B. In this case, in fact, since dt is an extremely short period, the variation in g (t) per first predetermined time dg (t)/dt is extremely small. Accordingly, the amplified signal G obtained by amplifying the output signal g from the acceleration sensor 7 may be used. Then, the difference ΔG in the amplified signal G is used for detecting the state of the acceleration sensor 7. Further, a signal such as a high frequency noise other than the measured result of the acceleration sensor 7 may be mixed with the output signal of the acceleration sensor 7. Thus, a noise may be appropriately eliminated by means of a low-pass filter. According to the present embodiment, a phrase of "on the basis of the measured result of the acceleration sensor 7" includes not only a case in which the output signal g of the acceleration sensor 7 is used as it is but also a case in which the output signal g that has been appropriately processed, i.e. amplified or filtered, is used.

Figure 4:
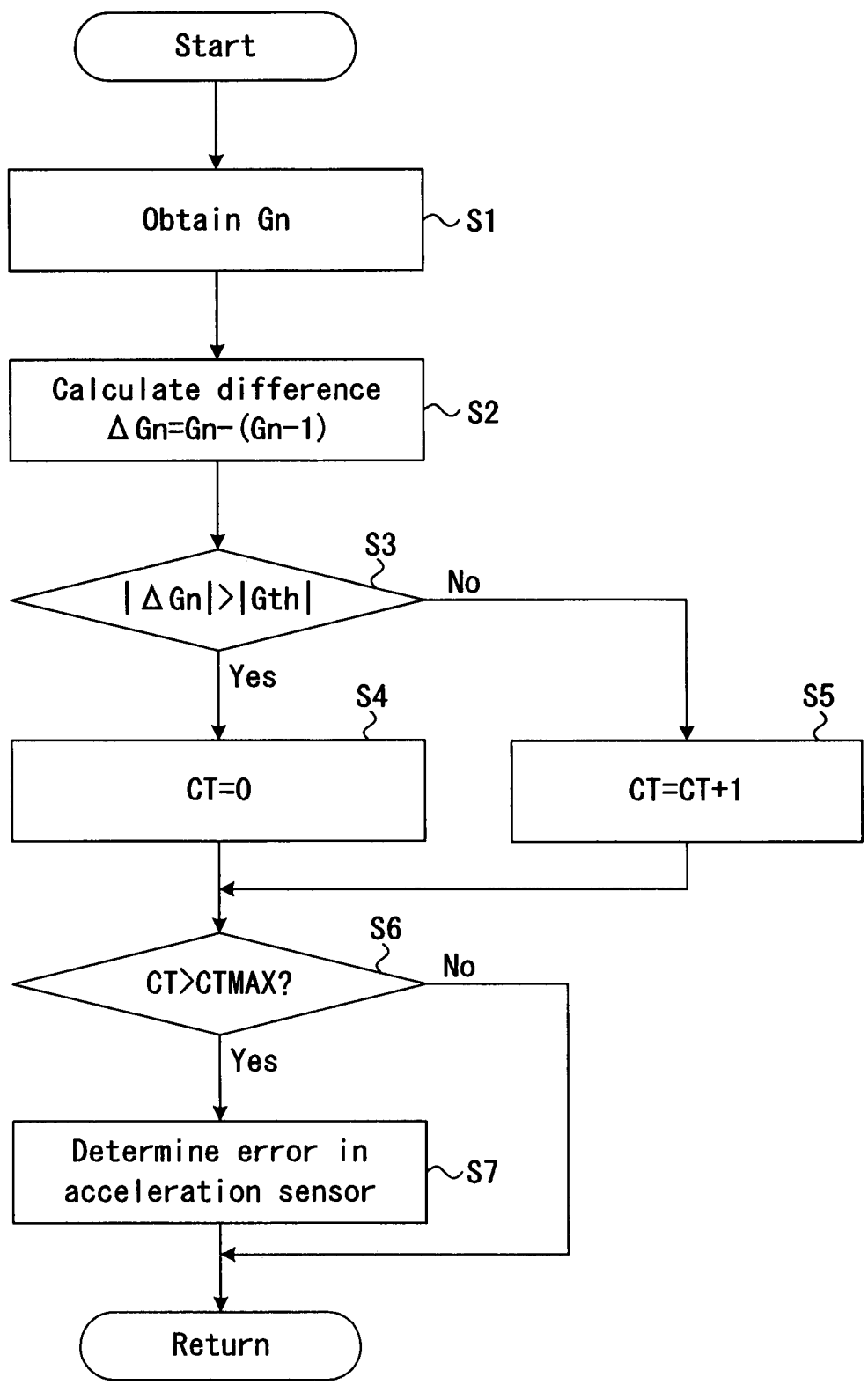
FIG. 4 is a flowchart for detecting a state of the acceleration sensor.

An example of procedures for detecting the error in the acceleration sensor 7 by the state detecting apparatus 10 will be explained with reference to a flowchart illustrated in FIG. 4. According to the present embodiment, the state of the acceleration sensor 7 is detected by using the amplified signal G that is obtained by amplifying the output signal g from the acceleration sensor 7. In Step 1 (Step will hereinafter be referred to as "S"), the calculating means 11 obtains an amplified signal Gn. Then, in S2, the calculating means 11 calculates ΔGn, which is a difference between the amplified signal Gn currently obtained and an amplified signal Gn-1 obtained immediately before the amplified signal Gn.

The determining means 12 receives the difference ΔGn calculated by the calculating means 11 and determines whether or not the difference ΔGn is above a predetermined upper limit value Gth and below a predetermined lower limit value −Gth in S3. When it is determined that the difference ΔGn is neither above the upper limit value Gth nor below the lower limit value −Gth, i.e. the difference ΔGn falls into a range between the upper limit value Gth and the lower limit value −Gth, an error time counter CT is incremented by one in S5. Meanwhile, when it is determined that the difference ΔGn is above the upper limit value Gth or below the lower limit value −Gth in S3, the error time counter CT is reset to zero in S4. Afterwards, the error time counter CT and an error time upper limit value CTMAX (which corresponds to the second predetermined time according to the present embodiment) are compared in S6. When it is determined that the error time counter CT exceeds the error time upper limit value CTMAX, the acceleration sensor 7 is determined as in the error state in S7. At this time, an occupant of the vehicle may be warned of the error in the acceleration sensor 7 by a warning light turned on, for example. In addition, the controlling method of the vibration isolator 100 may be switched to a method not relating to the measured result of the acceleration sensor 7. On the other hand, when it is determined that the error time counter CT is equal to or smaller than the error time upper limit value CTMAX in S6, the acceleration sensor 7 is not determined as in the error state. The processes from S1 to S6 are repeated so as to keep detecting the state of the acceleration sensor 7.

According to the aforementioned embodiment, the difference ΔG is obtained by subtracting the amplified signal Gn-1 acquired immediately before the currently obtained amplified signal Gn therefrom. However, the difference ΔG may be obtained by subtracting an amplified signal Gn-2 from the currently acquired amplified signal Gn, or the like. Further, according to the aforementioned embodiment, absolute values of the upper limit value and the lower limit value are identical with each other. However, the absolute values can be different from each other.

According to the aforementioned embodiment, in order to detect the state of the acceleration sensor 7 provided at the engine mount 9, the acceleration sensor 7 is determined as in the error state when a state, in which the difference between the measured results of the acceleration sensor 7 obtained per first predetermined time through calculation by the calculating means 11 is neither above the predetermined upper limit value Gth nor below the predetermined lower limit value −Gth, continues for the second predetermined time or longer. That is, the state of the acceleration sensor 7 is detected on the basis of the measured result of the acceleration sensor 7, i.e. on the basis of whether the measured result fluctuates. Accordingly, even when the measured result of the acceleration sensor 7 is fixed at an intermediate value between the upper limit value and the lower limit value, the error in the acceleration sensor 7 can be detected. Further, the state of the acceleration sensor 7 is detected on the basis of the measured result of the acceleration sensor 7 itself instead of a comparison between a measured result of the other sensor and a measured result of the acceleration sensor 7 as in the conventional manner. Thus, the error in the acceleration sensor 7 can be prevented from being wrongly detected at the time the acceleration sensor 7 is actually in the normal operating state. The acceleration sensor state detecting apparatus with high reliability can be obtained accordingly. As a result, the state of the acceleration sensor 7 can be appropriately detected.

Further, according to the aforementioned embodiment, at least three measured results used for acquiring the difference therebetween can be obtained within a half vibration period of the engine 13. That is, the difference is not obtained from identical measured values. As a result, the error in the acceleration sensor 7 can be prevented from being wrongly detected at the time the acceleration sensor 7 is actually in the normal operating state.

Furthermore, according to the aforementioned embodiment, the first predetermined time and the second predetermined time can be defined, on the basis of the measured result of a frequency detecting means, to an appropriate value in response to the number of vibrations of the vibrating body. As a result, the state of the acceleration sensor can be more precisely detected.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An acceleration sensor state detecting apparatus for detecting a state of an acceleration sensor provided at a vibrating body, comprising:
   a calculating means for calculating a difference between measured results of the acceleration sensor obtained per first predetermined time that is shorter than a vibration period of the vibrating body; and
   a determining means for determining that the acceleration sensor is in an error state in a case that a state in which the difference calculated falls into a range between a predetermined upper limit value and a predetermined lower limit value continues for a second predetermined time or more.

2. An acceleration sensor state detecting apparatus according to claim 1, wherein the first predetermined time is equal to or smaller than a third of a half period of the vibration period.

3. An acceleration sensor state detecting apparatus according to claim 1, further comprising a frequency detecting means for measuring a vibration frequency of the vibrating body, wherein at least one of the first predetermined time and the second predetermined time is determined on the basis of a measured result of the frequency detecting means.

4. An acceleration sensor state detecting apparatus according to claim 2, further comprising a frequency detecting means for measuring a vibration frequency of the vibrating body, wherein at least one of the first predetermined time and the second predetermined time is determined on the basis of a measured result of the frequency detecting means.

* * * * *